(12) United States Patent
Tanaka et al.

(10) Patent No.: US 10,127,479 B2
(45) Date of Patent: Nov. 13, 2018

(54) ELECTRONIC DEVICE

(71) Applicant: KYOCERA Corporation, Kyoto-shi, Kyoto (JP)

(72) Inventors: Junji Tanaka, Shijyonawate (JP); Katsumi Arao, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/879,424

(22) Filed: Jan. 24, 2018

(65) Prior Publication Data

US 2018/0211141 A1 Jul. 26, 2018

(30) Foreign Application Priority Data

Jan. 25, 2017 (JP) ................ 2017-011251

(51) Int. Cl.
| | | |
|---|---|---|
| G06K 7/00 | (2006.01) |
| H04B 1/38 | (2015.01) |
| G06K 13/08 | (2006.01) |
| G06K 19/077 | (2006.01) |
| H04B 1/3816 | (2015.01) |
| H04B 1/3818 | (2015.01) |
| H01R 24/62 | (2011.01) |
| H01R 12/70 | (2011.01) |
| H01R 13/24 | (2006.01) |

(52) U.S. Cl.
CPC ....... *G06K 13/0831* (2013.01); *G06K 7/0043* (2013.01); *G06K 7/0073* (2013.01); *G06K 13/0825* (2013.01); *G06K 19/07737* (2013.01); *H04B 1/3816* (2013.01); *H04B 1/3818* (2015.01); *H01R 12/7076* (2013.01); *H01R 13/2442* (2013.01); *H01R 24/62* (2013.01); *H04M 2250/14* (2013.01)

(58) Field of Classification Search
CPC .. G06K 7/0043; H04B 1/3816; H04B 1/3818; H04M 2250/14
See application file for complete search history.

(56) References Cited

U.S. PATENT DOCUMENTS

| | | | | |
|---|---|---|---|---|
| 5,933,328 A * | 8/1999 | Wallace | ............. | G06K 13/0862 257/678 |
| 6,424,118 B1 * | 7/2002 | Tu | ........................ | G06K 7/0034 320/114 |
| 8,968,030 B2 * | 3/2015 | Zhang | .................. | H05K 5/0286 439/630 |
| 2002/0094841 A1 * | 7/2002 | Sakaguchi | ........... | G06K 7/0021 455/558 |

(Continued)

FOREIGN PATENT DOCUMENTS

JP 2001-134342 A 5/2001

*Primary Examiner* — Adrian S Wilson
(74) *Attorney, Agent, or Firm* — Hauptman Ham, LLP (57) ABSTRACT

An electronic device includes a first accommodation portion to accommodate a first card, a second accommodation portion to accommodate a second card, and a holding member capable of holding the first card and the second card. The first accommodation portion and the second accommodation portion are arranged so that an ejection path of the first card and an ejection path of the second card overlap. The holding member is located in an area where the ejection path of the first card and the ejection path of the second card overlap.

10 Claims, 10 Drawing Sheets

(56) References Cited

U.S. PATENT DOCUMENTS

| | | | | |
|---|---|---|---|---|
| 2002/0118826 A1* | 8/2002 | Kiernan | ............... | H04M 1/0262 |
| | | | | 379/433.09 |
| 2003/0227763 A1* | 12/2003 | Kao | ..................... | G06K 7/0021 |
| | | | | 361/818 |
| 2004/0092149 A1* | 5/2004 | Scuteri | ................. | G06K 7/0021 |
| | | | | 439/326 |
| 2005/0255753 A1* | 11/2005 | Buschmann | ......... | G06K 7/0021 |
| | | | | 439/630 |
| 2006/0281356 A1* | 12/2006 | Zuo | ..................... | H04B 1/3816 |
| | | | | 439/325 |
| 2007/0127220 A1* | 6/2007 | Lippert | ................. | G06F 1/1613 |
| | | | | 361/737 |
| 2009/0241303 A1* | 10/2009 | Zhu | ..................... | G06K 7/0021 |
| | | | | 24/591.1 |
| 2013/0235548 A1* | 9/2013 | Chang | ................. | G06K 7/0039 |
| | | | | 361/810 |
| 2013/0258605 A1* | 10/2013 | Hsu | ..................... | H04B 1/3816 |
| | | | | 361/727 |

\* cited by examiner

FIG. 11

ELECTRONIC DEVICE

CROSS-REFERENCE TO RELATED APPLICATION

This application claims priority to and the benefit of Japanese Patent Application No. 2017-011251 filed Jan. 25, 2017, the entire contents of which are incorporated herein by reference.

TECHNICAL FIELD

The present disclosure relates to an electronic device. More particularly, the present disclosure relates to an electronic device that accommodates cards, such as a memory card.

BACKGROUND

Many current electronic devices, including communication terminals such as mobile phones or smartphones, can use cards, such as memory cards and SIM cards (hereinafter, collectively referred to as IC cards). Many of such electronic devices can accommodate IC cards inside a body for use. A technology is proposed that is capable of easily connecting electronic components such as memory cards.

SUMMARY

An electronic device according to the present disclosure includes: a first accommodation portion to accommodate a first card, a second accommodation portion to accommodate a second card, and a holding member capable of holding the first card and the second card. The first accommodation portion and the second accommodation portion are arranged so that an ejection path of the first card and an ejection path of the second card overlap. The holding member is located in an area where the ejection path of the first card and the ejection path of the second card overlap.

DETAILED DESCRIPTION

Recent electronic devices comprise an enormous number of components, including electronic components, which are housed inside a small body. Thus the space left to accommodate IC cards inside the body of such mobile devices is extremely limited. Additionally, mechanisms for housing IC cards are often elaborate and fragile, and careful handling is necessary when taking out an IC card from an electronic device or housing an IC card in an electronic device. Therefore, the convenience of an electronic device that accommodates IC cards can be enhanced by effectively utilizing its internal space and by realizing a non-fragile configuration. Also, it is desirable to enhance the convenience of an electronic device that accommodates cards such as IC cards.

Embodiments of the present disclosure are described below with reference to the drawings.

The embodiments of the present disclosure describe a mobile phone such as a smartphone as an example of an electronic device. Embodiments of the present disclosure, however, are not limited to mobile phones such as smartphones, but may be, for example, feature phone type mobile phones. Additionally, embodiments of the present disclosure are not necessarily limited to mobile phones, but may be various electronic devices, such as tablets, remote control terminals for remotely operating an electronic device, digital cameras, or notebook PCs. In summary, embodiments of the present disclosure may be any electronic device having accommodation portions to accommodate cards such as IC cards.

Also, the embodiments of the present disclosure describe an electronic device that accommodates a plurality of cards, such as a memory card and a SIM card. The memory card can be any card which functions as a storage device, such as a SD memory card (SD card), a mini SD card, or a micro SD card; and the SIM (Subscriber Identity Module) card can be any IC card in which an IC number for identifying a subscriber to a communication service is recorded, such as a micro SIM card, or a nano-SIM card. In the following description, the SIM card encompasses a UIM (User Identity Module) card and the like. Cards to be accommodated in the electronic device according to the embodiment of the present disclosure, however, are not limited to IC cards such as these memory cards or SIM cards. As the electronic device according to the embodiment of the present disclosure is characterized by mechanisms for housing cards, it may accommodate any card such as an IC card. In the embodiments of the present disclosure described below, the aforementioned cards are collectively referred to as "IC cards" or simply "cards" as appropriate.

Figure 1:
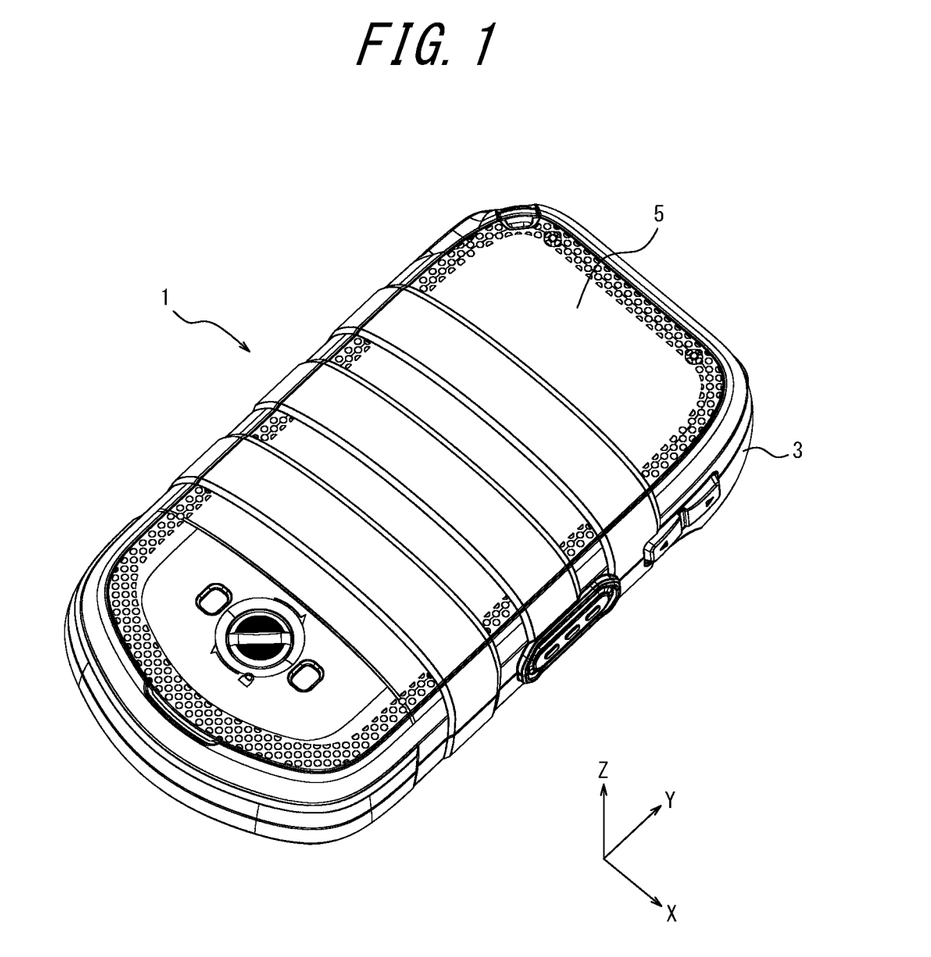
FIG. 1 is an external perspective view of an electronic device according to an embodiment of the present disclosure.

FIG. 1 is a perspective view illustrating the appearance of the electronic device according to the embodiment of this disclosure.

As illustrated in FIG. 1, the electronic device 1 according to this embodiment includes a housing 3 and a battery lid 5 (hereinafter, simply referred to as "lid 5") in appearance. In the case where the electronic device 1 is a smartphone, as illustrated in FIG. 1, a surface of the lid 5 facing a Z-axis positive direction can typically be a back surface of the electronic device 1, and a surface of the housing 3 facing a Z-axis negative direction can typically be a front surface of the electronic device 1. On the front surface of the electronic device 1, for example, a display for displaying various kinds of information and a touch panel for detecting the user's operations can be arranged. Further, as illustrated in FIG. 1, on a side portion or the like of the housing 3, various members such as button type switches for detecting the user's operations can be provided.

Hereinafter, description with limited relevance from the viewpoint of accommodating cards such as IC cards in the electronic device 1 is simplified or omitted as appropriate. In particular, the electronic device 1 enables various functions by transmitting and receiving information to and from internally accommodated IC cards. The information transmitted and received to and from the IC cards is processed by a controller, such as a CPU (Central Processing Unit). The electronic device 1 may be provided with any processor, including such a controller, however, illustration and description of these configurations and their processes or operations are omitted.

The housing 3 constitutes a housing of the electronic device 1, and accommodates components constituting the electronic device 1. The housing 3 also accommodates a battery, which supplies electric power for operating the electronic device 1. The lid 5 covers the battery accommodated in the electronic device 1. As illustrated in FIG. 1, in this embodiment, the housing 3 and the lid 5 can be combined to constitute a housing of the entire electronic device 1. In this case, providing packing in a part where the housing 3 and the lid 5 are fitted enables waterproofing, and thus prevents moisture or the like from entering into the housing of the electronic device 1. The housing 3 and the lid 5 are not limited to the configuration illustrated in FIG. 1. Any configuration capable of combining the housing 3 and the lid 5 can be adopted.

Figure 2A:
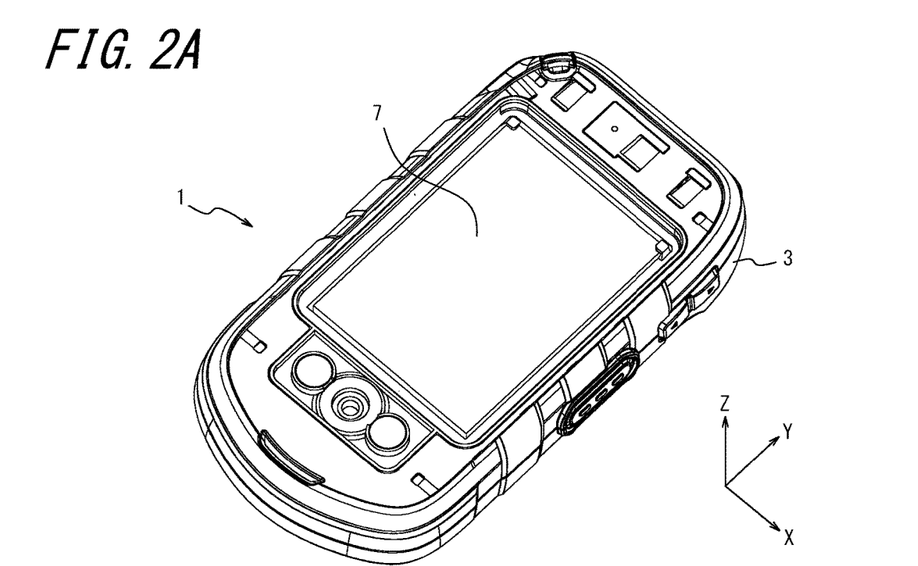
FIGS. 2A and 2B are external perspective views of the electronic device according to the embodiment of the present disclosure.
Figure 2B:
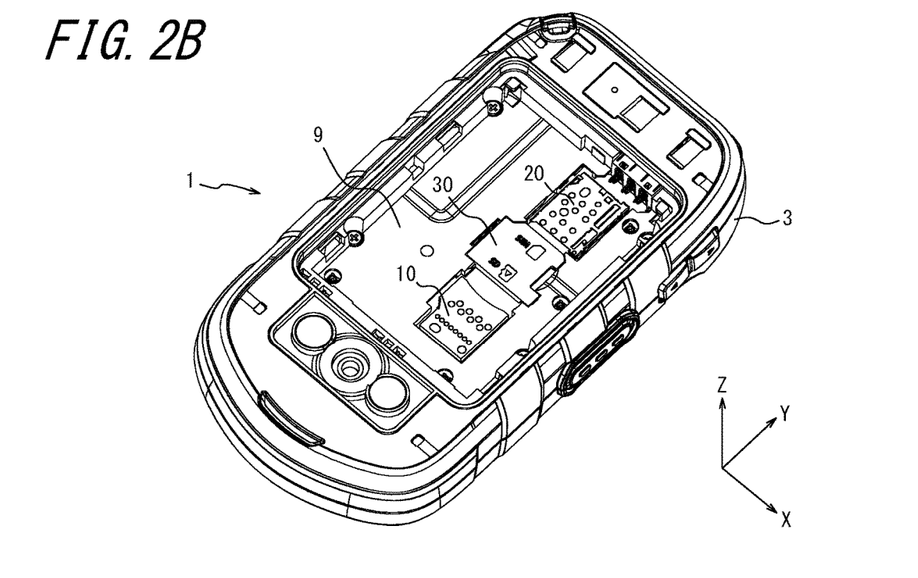

FIGS. 2A and 2B are perspective views illustrating the internal structure of the electronic device 1. FIG. 2A illustrates a state in which the lid 5 is removed from the housing 3 of the electronic device 1, and FIG. 2B illustrates a state in which, in addition to the lid 5, a battery 7 is further removed from the housing 3.

As illustrated in FIG. 2A, the battery 7 is exposed after removing the lid 5 from the housing 3. In FIG. 2A, an upper end portion (the end portion in a Y-axis positive direction) of the battery 7 is locked by claw-like latches provided on the housing 3 side. The user can remove the battery 7 from the housing 3 by lifting a lower end portion (the end portion in a Y-axis negative direction) of the battery 7 in the Z-axis positive direction. The latches are not limited to claw-like members illustrated in FIG. 2B, but may be of any shape and configuration capable of locking the battery 7 in the electronic device 1.

The battery 7 can be any secondary battery or primary battery having a capacity suitable for operating the electronic device 1, and may have various electrical characteristics according to the functions and specifications of the electronic device 1. Hereinafter, description in terms of electrical characteristics of the battery 7 is simplified or omitted as appropriate.

The battery 7, which can have a shape close to a rectangular parallelepiped as illustrated in FIG. 2A, has a terminal for supplying electric power to the electronic device 1. The terminal is configured to contact a terminal on the electronic device 1 side when the battery 7 is accommodated in the electronic device 1. The housing 3 and the battery 7 are not limited to the configuration illustrated in FIGS. 2A and 2B. Any configuration in which the terminal of the battery 7 contacts the terminal on the electronic device 1 side can be adopted.

As illustrated in FIG. 2B, the electronic device 1 has a battery accommodation space 9 (hereinafter, simply referred to as "space 9") in the housing 3. The electronic device 1 accommodates the battery 7 in the space 9. In FIG. 2B, the battery 7 is removed from the space 9.

As illustrated in FIG. 2B, the electronic device 1 according to this embodiment includes a first accommodation portion 10, a second accommodation portion 20, and a holding member 30. The first accommodation portion 10, the second accommodation portion 20 and the holding member 30 can be provided at the bottom of the space 9 of the electronic device 1.

In the following example, it is assumed that the first accommodation portion 10 accommodates a micro SD card and the second accommodation portion 20 accommodates a nano-SIM card for the purposes of description. The electronic device 1 according to this embodiment, however, is not limited to such a configuration. For example, the first accommodation portion 10 may accommodate a SIM card, and the second accommodation portion 20 may accommodate a SD card. In another example, both the first accommodation portion 10 and the second accommodation portion 20 may accommodate either SD cards or SIM cards. In yet a further example, both the first accommodation portion 10 and the second accommodation portion 20 may accommodate cards other than SD cards and SIM cards.

Mechanisms for housing cards in the electronic device 1 according to this embodiment are described below. FIGS. 3A, 3B, 4A, 4B, 5A, 5B, and 6 illustrate the mechanisms by which the electronic device 1 accommodates the cards.

Figure 3A:
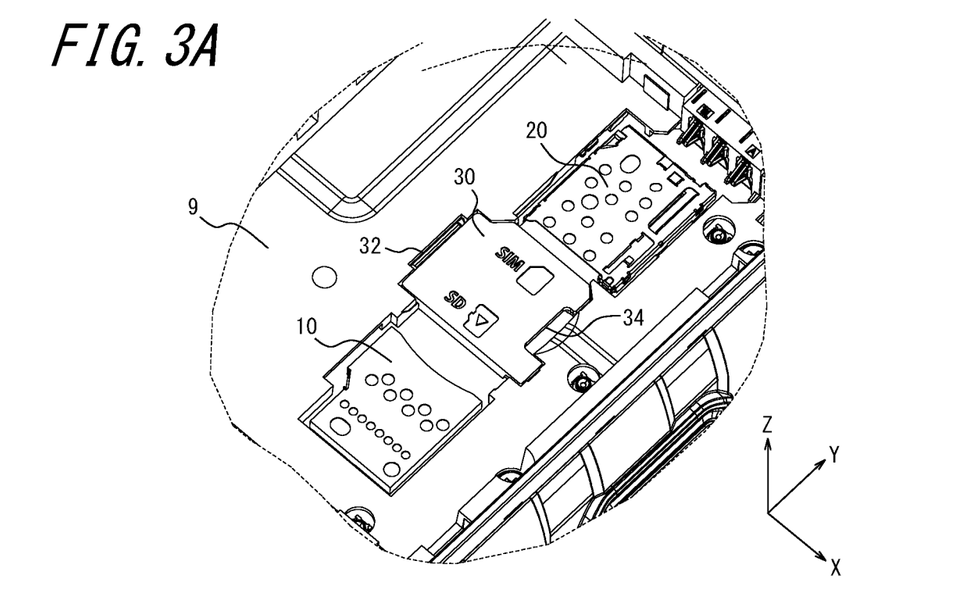
FIGS. 3A and 3B are enlarged perspective views illustrating operation of the electronic device according to the embodiment of the present disclosure.

FIG. 3A is an enlarged view of an area of the space 9 illustrated in FIG. 2B which includes the first accommodation portion 10, the second accommodation portion 20, and the holding member 30. As illustrated in FIG. 3A, the electronic device 1 includes the first accommodation portion 10, the second accommodation portion 20, and holding member 30 at the bottom of the space 9. As will be described later, the first accommodation portion 10 accommodates a first card, which may typically be a SD card; and the second accommodation portion 20 accommodates a second card, which may typically be a nano-SIM card.

The holding member 30, as will be described later, functions to hold the cards to be accommodated in the first accommodation portion 10 and the second accommodation portion 20. In this embodiment, as illustrated in FIG. 3A, the holding member 30 provided between the first accommodation portion 10 and the second accommodation portion 20 is capable of holding both the first card 12 and the second card 22.

As illustrated in FIG. 3A, the holding member 30 has a connection portion 32 and a notch 34. The connection portion 32, which connects the holding member 30 and the bottom of the space 9, can be provided on the holding member 30 side or on the housing 3 side in the space 9.

The holding member 30, for example, can be formed to have at least partial elasticity. Thus, the holding member 30 is preferably at least partially formed from an elastic material, such as TPU (Thermoplastic Polyurethane), elastomer, or rubber. Alternatively, the holding member 30 may be wholly formed from an elastic material, or integrally molded with the connection portion 32 from an elastic material. In this manner, by forming the holding member 30 (and the connection portion 32) from an elastic material, the durability of the holding member 30 itself can be improved.

Figure 3B:
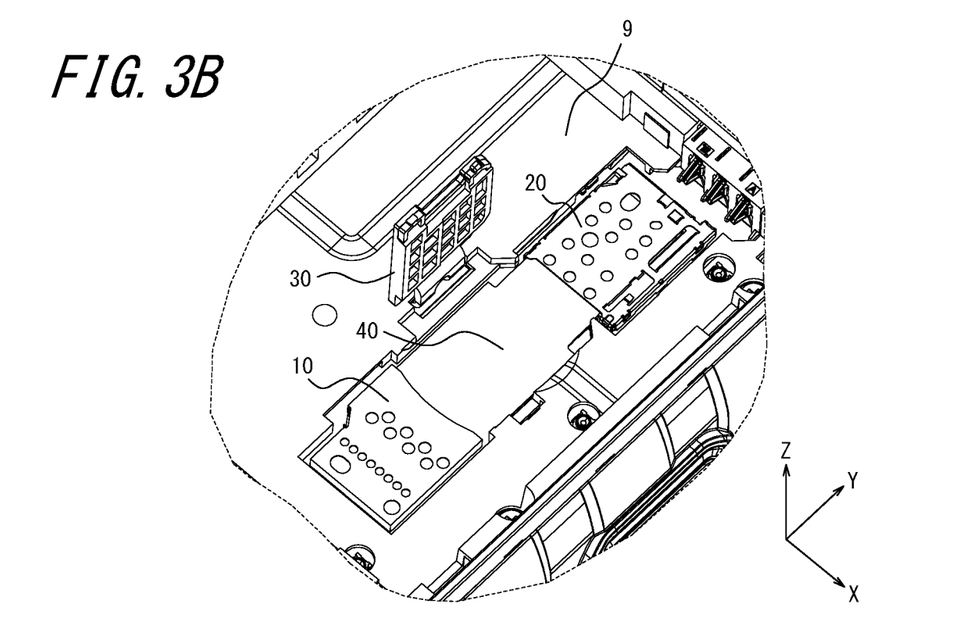

FIG. 3B illustrates a state in which the holding member 30 illustrated in FIG. 3A is displaced. In this way, the holding member 30 can be displaced from the state illustrated in FIG. 3A to the state illustrated in FIG. 3B. Hereinafter, the state of the holding member 30 illustrated in FIG. 3A is referred to as a "closed state", and the state of the holding member 30 illustrated in FIG. 3B is referred to as an "open state" for convenience. As illustrated in FIG. 3B, an ejection path for the cards 40 (hereinafter, simply referred to as "ejection path 40") is exposed when the holding member is in the open state.

The notch 34 can be formed in the holding member 30 to hook the user's nail or the like. The user can hook his or her nail to the notch 34 to easily displace the holding member 30 from the "closed state" illustrated in FIG. 3A to the "open state" illustrated in FIG. 3B. The notch 34 can be any shape and is not limited to the shape illustrated in FIG. 3A. Moreover, forming the notch 34 is optional and a simple configuration without forming the notch 34 may be adopted.

As illustrated in FIGS. 3A and 3B, various mechanisms can be adopted to achieve the closed state and the open state of the holding member 30. For example, a mechanism can be provided to enable rotation of the holding member 30 around an end (the end in an X-axis negative direction). In this case, the connection portion 32 constitutes the mechanism. In this way, the holding member 30 may be made displaceable in the electronic device 1 by rotation around one side of the holding member 30 as an axis.

In a further example, the connection portion 32 formed from an elastic material may have a certain length and, in the closed state illustrated in FIG. 3A, the length portion may be configured to be accommodated inside the space 9. In this case, in the open state illustrated in FIG. 3B, the length portion can extend from the inside of the space 9 to make the holding member 30 displaceable. Such a configuration can keep the holding member 30 at the bottom of the space 9 in the closed state illustrated in FIG. 3A, meanwhile, it can release at least a part of the holding member 30 from the bottom of the space 9 in the open state illustrated in FIG. 3B. In this way, in the electronic device 1, the holding member 30 may be made displaceable by releasing at least a part of the holding member 30.

Figure 4A:
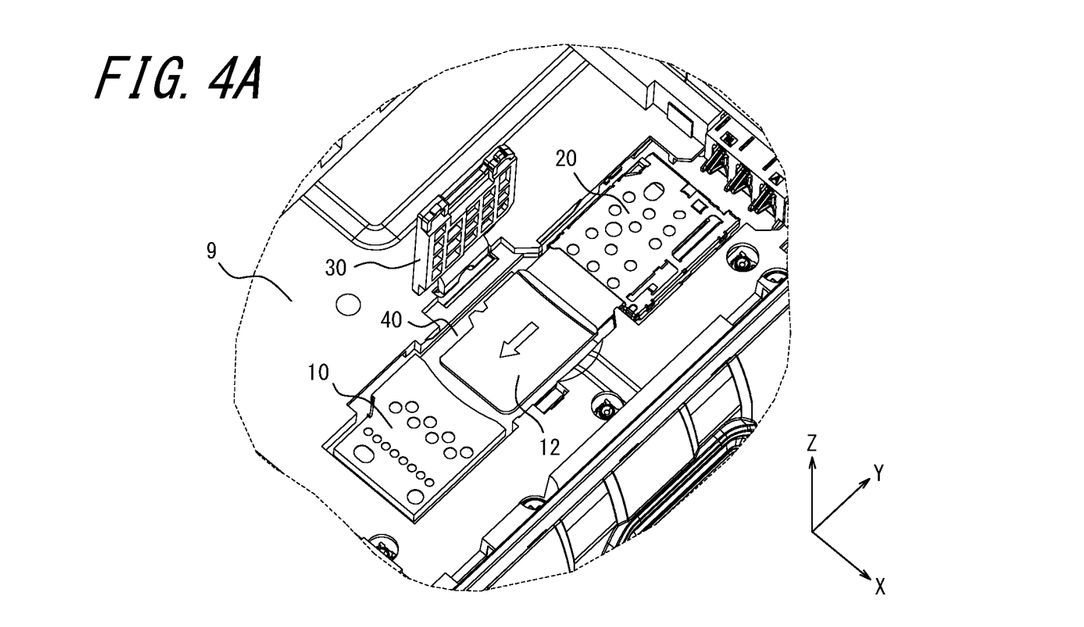
FIGS. 4A and 4B are enlarged perspective views illustrating operation of the electronic device according to the embodiment of the present disclosure.
Figure 4B:
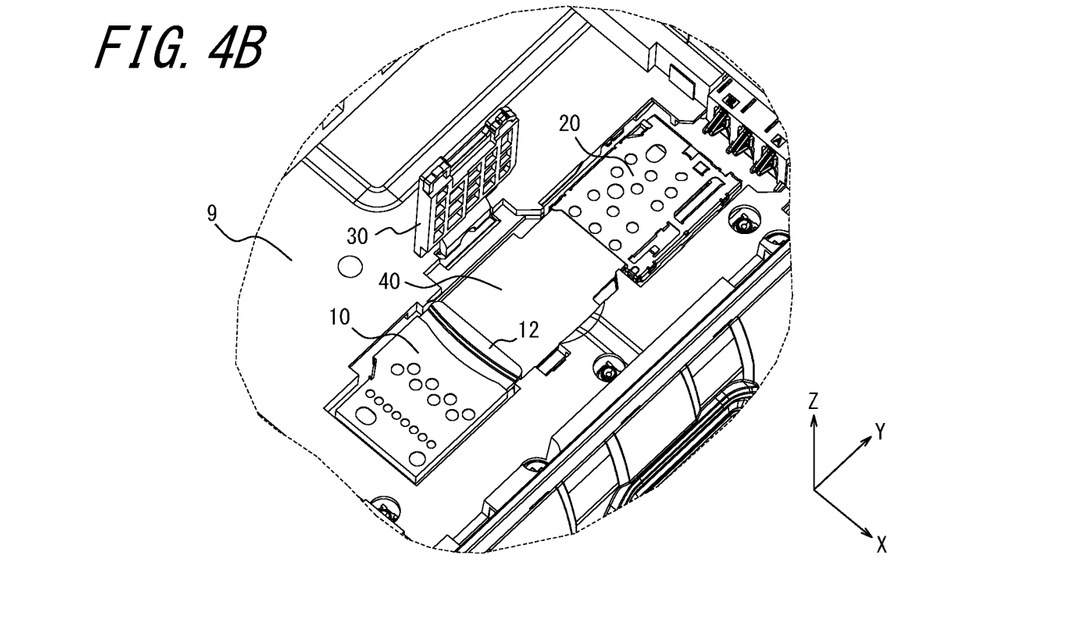

FIGS. 4A and 4B illustrate how to house a card in the first accommodation portion 10. More specifically, FIG. 4A illustrates a state just before housing a card in the first accommodation portion 10, and FIG. 4B illustrates a state immediately after housing a card in the first accommodation portion 10.

As illustrated in FIG. 4A, when housing the first card 12 in the first accommodation portion 10 in the electronic device 1 according to this embodiment, initially, the first card 12 is placed in the ejection path 40. Here, attention should be paid to the front and back sides of the first card 12, the insertion direction, and the like. It is preferable to give a warning as described above on a surface of the holding member 30 facing the Z-positive direction illustrated in FIG. 3A and/or on a surface of the ejection path 40 facing the Z-positive direction illustrated in FIG. 3B.

Next, after the first card 12 has been placed in the ejection path 40, the first card 12 is slid and is inserted in a direction of the arrow illustrated in FIG. 4A (Y-axis negative direction). Thereby, the user can house the first card 12 in the first accommodation portion 10, as illustrated in FIG. 4B. When the first card 12 has slid as far as possible, it reaches an end of the first accommodation portion 10 where it is electrically connected to the electronic device 1. The inside of the first accommodation portion 10 can be configured so that respective terminals come into contact while the first card 12 is accommodated in the first accommodation portion 10.

In the state illustrated in FIG. 4B, by returning the holding member 30 to the closed state (see FIG. 3A), the holding member 30 holds the first card 12 so as to prevent ejection from the first accommodation portion 10. In this way, the first accommodation portion 10 can stably hold the first card 12, even when only the first card 12 is accommodated in the electronic device 1 according to this embodiment.

Figure 5A:
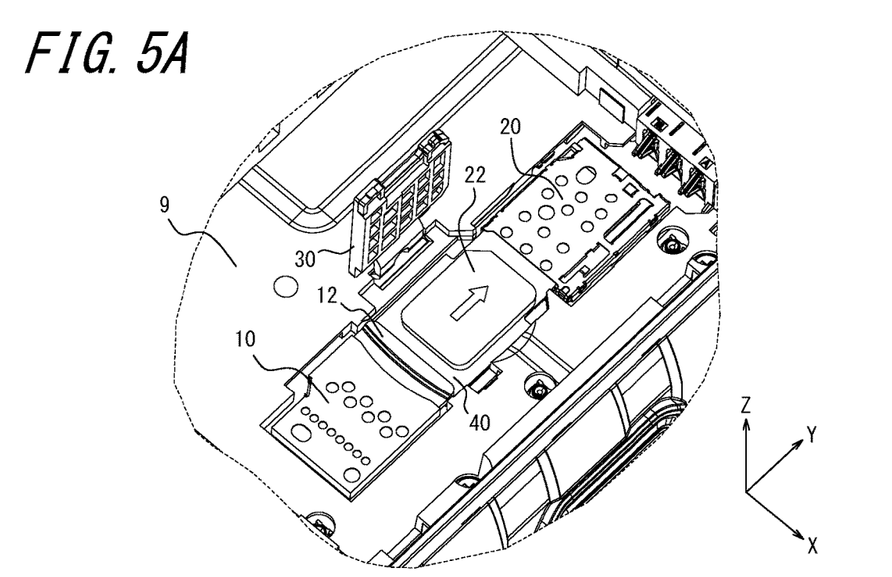
FIGS. 5A and 5B are enlarged perspective views illustrating operation of the electronic device according to the embodiment of the present disclosure.
Figure 5B:
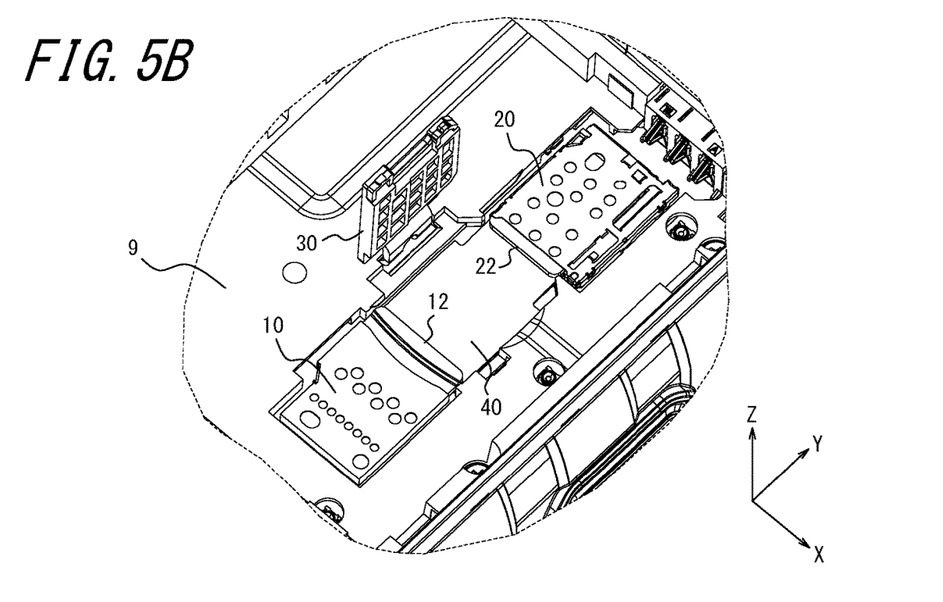

FIGS. 5A and 5B illustrate how to house a card in the second accommodation portion 20, after housing the first card 12 in the first accommodation portion 10. More specifically, FIG. 5A illustrates a state just before housing a card in the second accommodation portion 20, and FIG. 5B illustrates a state immediately after housing a card in the second accommodation portion 20.

As illustrated in FIG. 5A, when housing the second card 22 in the second accommodation portion 20 in the electronic device 1 according to this embodiment, initially, the second card 22 is placed in the ejection path 40. Here, attention should be paid to the front and back sides of the second card 22, the insertion direction, and the like. It is preferable to give a warning as described above on the surface facing the Z-positive direction of the holding member 30 illustrated in FIG. 3A and/or on the surface facing the Z-positive direction of the ejection path 40 illustrated in FIG. 3B. Further, as illustrated in FIG. 5A, the first accommodation portion 10 and the second accommodation portion 20 are arranged so that the ejection path of the first card 12 and the ejection path of the second card 22 overlap. That is, in the electronic device 1, the ejection path of the first card 12 and the ejection path of the second card 22 are shared as a common ejection path for cards. Additionally, the holding member can be located in an area where the ejection path of the first card 12 and the ejection path of the second card 22 overlap.

Next, after the second card 22 has been placed in the ejection path 40, the second card is slid and inserted in a direction of the arrow illustrated in FIG. 5A (Y-axis positive direction). Thereby, the user can house the second card 22 in the second accommodation portion 20, as illustrated in FIG. 5B. When the second card 22 has slid as far as possible, it reaches an end of the second accommodation portion 20 where it is electrically connected to the electronic device 1. The inside of the second accommodation portion 20 can be configured so that respective terminals come into contact while the second card 22 is accommodated in the second accommodation portion 20.

In the state illustrated in FIG. 5B, by returning the holding member 30 to the closed state, the holding member 30 holds the first card 12 so as to prevent ejection from the first accommodation portion 10, and holds the second card 22 so as to prevent ejection from the second accommodation portion 20.

Figure 6:
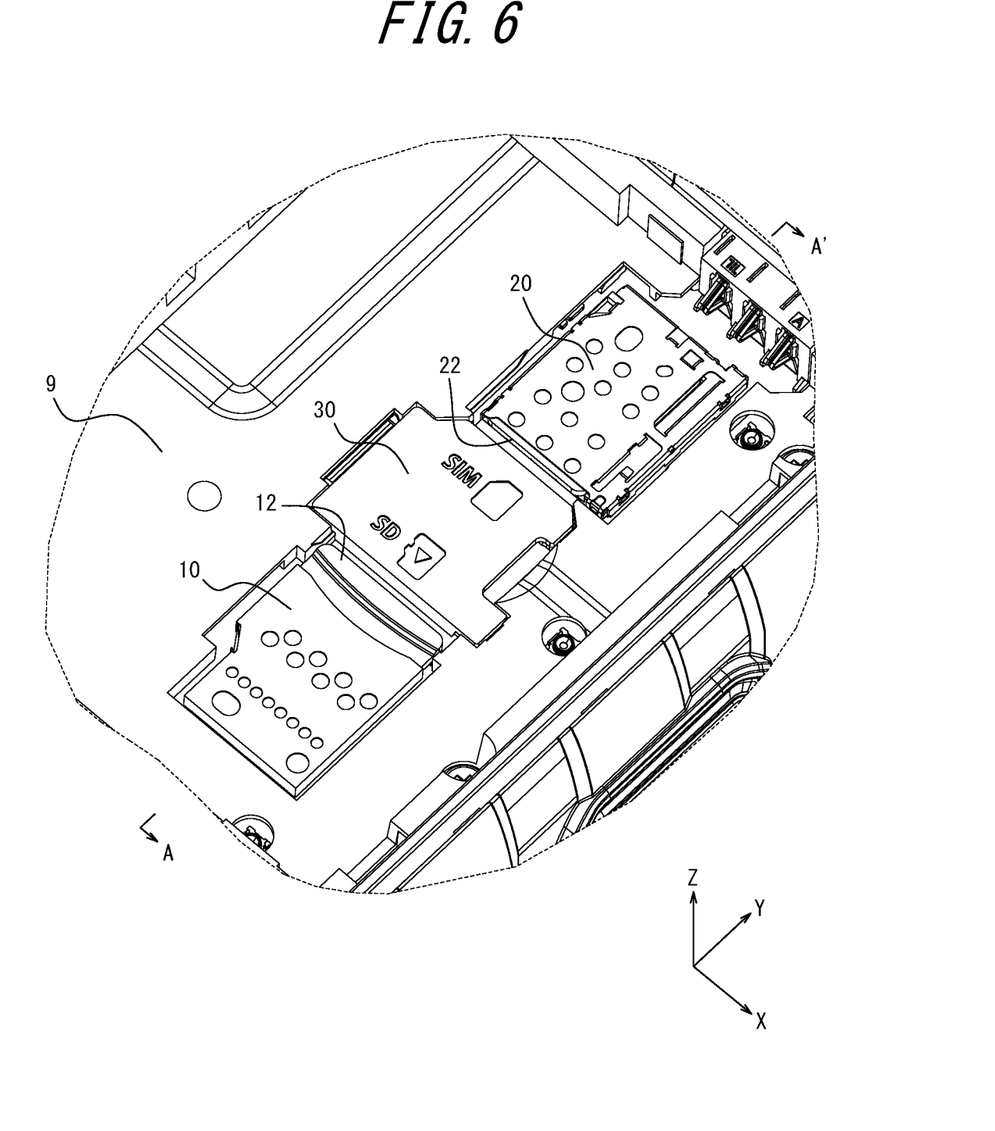
FIG. 6 is an enlarged perspective view illustrating operation of the electronic device according to the embodiment of the present disclosure.

FIG. 6 is an enlarged view of a state where the first card 12 is accommodated in the first accommodation portion 10, the second card 22 is accommodated in the second accommodation portion 20, and the holding member 30 is returned to the closed state thereafter. As illustrated in FIG. 6, in the electronic device 1 according to this embodiment, both the first card 12 accommodated in the first accommodation portion 10 and the second card 22 accommodated in the second accommodation portion 20 are stably held. Additionally, the second accommodation portion 20 can stably hold the second card 22, even when only the second card 22 is accommodated in the electronic device 1 according to this embodiment, in a similar manner to that of the first card 12.

As described above, in the electronic device 1 according to this embodiment, the first accommodation portion 10 accommodates the first card 12; the second accommodation portion 20 accommodates the second card 22; the holding member 30 is capable of holding the first card 12 and the second card 22; the first accommodation portion 10 and the second accommodation portion 20 are arranged so that the ejection path of the first card 12 and the ejection path of the second card 22 overlap; and the holding member 30 is located in the area where the ejection path of the first card 12 and the ejection path of the second card 22 overlap.

Further, in the electronic device 1, the holding member 30 prevents the first card 12 from being ejected from the first accommodation portion 10 and prevents the second card 22 from being ejected from the second accommodation portion 20, by blocking the ejection path of the first card 12 and the ejection path of the second card 22. In other words, the holding member 30 holds the first card 12 and the second card 22 by blocking the ejection path of the first card 12 and the ejection path of the second card 22.

Additionally, in the electronic device 1, the holding member 30 is displaceable from a state in which it holds the first card 12 and the second card 22 (see FIG. 6) to a state in which it does not hold the first card 12 and the second card 22 (see FIG. 5B). The holding member 30 is displaceable from the state holding the first card 12 and the second card 22 by releasing at least a part of the holding member 30.

According to the electronic device 1 of this embodiment, each of the first accommodation portion 10 and the second accommodation portion 20 can accommodate the first card 12 or the second card 22, which have one or more terminals on their main surfaces. This enables simplification of a configuration for connecting the electronic device 1 with both the first card 12 and the second card 22. Further, to alert the user that the holding member 30 is a movable part, the holding member 30 may be given a color different from that of other members in the housing 3 or the space 9. Further, to alert the user that the holding member 30 is a moveable part, the holding member 30 may be a relatively large member. According to this embodiment, by using an elastic material, even a relatively large holding member 30 can be made difficult to break. Consequently, even after the electronic device 1 has been put on the market, problems associated with the holding member for cards can be significantly reduced.

Further, in the electronic device 1 according to this embodiment, the holding member 30 has a main function of holding both the first card 12 accommodated in the first accommodation portion 10 and the second card 22 accommodated in the second accommodation portion 20. Therefore, it is not necessary to configure the holding member 30 such that it is arranged without clearance from the first card 12 and the second card 22. For example, as illustrated in FIG. 6, the holding member 30 may be arranged with slight clearance from the first card 12 and/or the second card 22. However, movement of the first card 12 or the second card 22 in the clearance formed in this way should not cut off electrical connections between each card and the electronic device 1.

Figure 7:
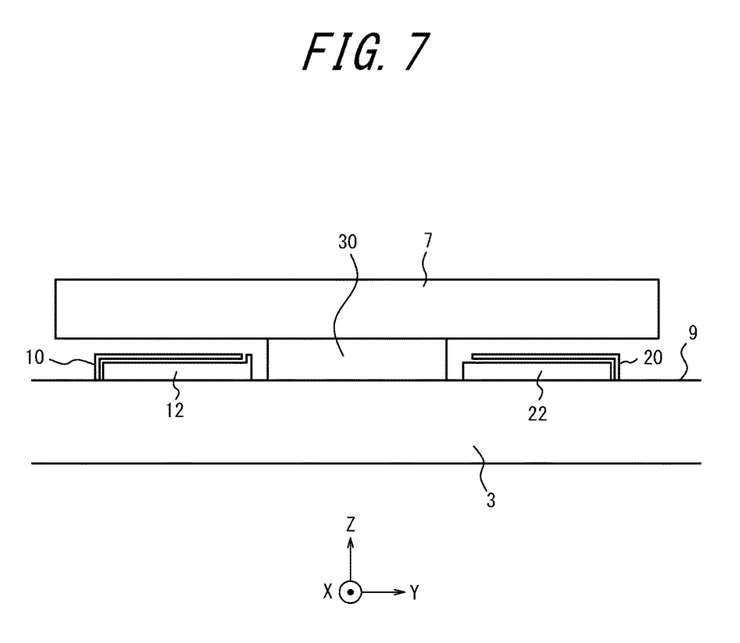
FIG. 7 is a cross-sectional view of the electronic device according to the embodiment of the present disclosure.

The following describes an arrangement structure of the first accommodation portion 10, the second accommodation portion 20, the holding member 30, and the battery 7, in the electronic device 1 according to the present embodiment. FIG. 7 is a cross-sectional view taken from line A-A' of the electronic device 1 illustrated in FIG. 6.

As illustrated in FIG. 7, in the electronic device 1, the first accommodation portion 10 and the second accommodation portion 20 can be provided at the bottom of the space 9 for accommodating the battery 7. More specifically, the first accommodation portion 10 and the second accommodation portion 20 are provided on a bottom surface of the space 9 formed in the housing 3 facing the Z-axis positive direction. FIG. 7 illustrates a state in which the first card 12 is accommodated in the first accommodation portion 10 and the second card 22 is accommodated in the second accommodation portion 20. As illustrated in FIG. 7, the holding member 30 can be formed into a plate-like shape, and its height (thickness in a Z-axis direction) can be configured to be larger than the heights (thickness in the Z-axis direction) of the first accommodation portion 10 and the second accommodation portion 20.

Such a configuration suppresses movement of the holding member 30 away from the space 9 in the Z-axis positive direction while the battery 7 is attached to the electronic device 1. In this way, the electronic device 1 can reduce such movement. Further, such a configuration prevents the battery 7 from interfering with the first accommodation portion 10 and the second accommodation portion 20 while the battery 7 is attached to the electronic device 1. Thus, the occurrence of trouble in the first accommodation portion 10 and the second accommodation portion 20, as well as the first card 12 and the second card 22, due to arrangement of the battery 7 is prevented.

As described above, in this embodiment, the holding member 30 can be formed according to a plate-like shape. Further, in the electronic device 1, the battery 7 can suppress displacement of the holding member 30. According to this embodiment, not only is the holding member 30 difficult to break, but the cards 12 and 22, and the accommodation portions 10 and 20 can also be made difficult to break.

Figure 8:
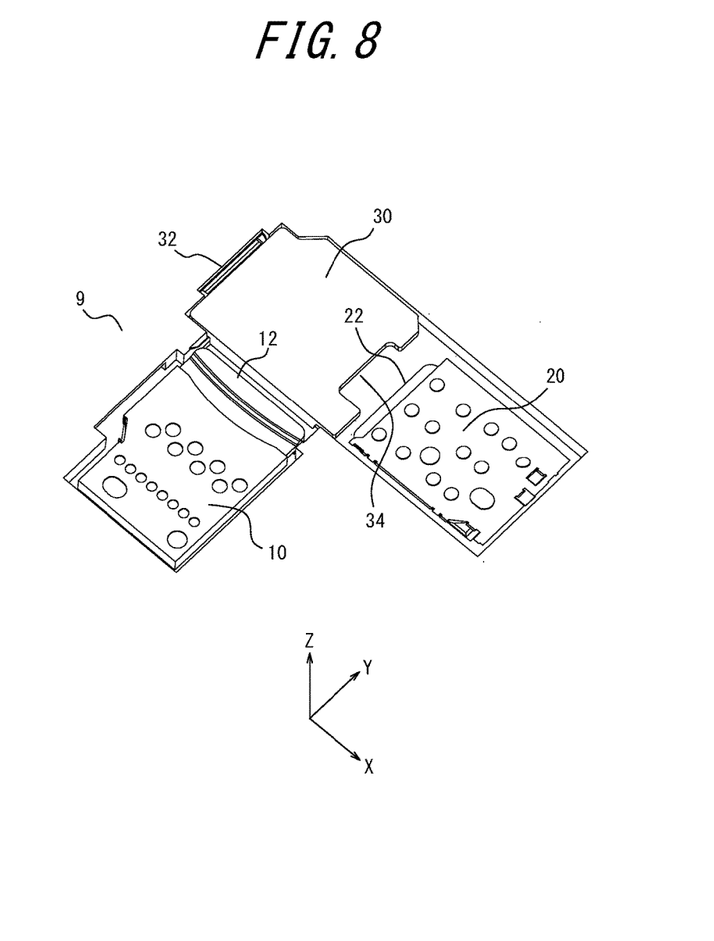
FIG. 8 is an enlarged perspective view of an electronic device according to a variation of the embodiment of the present disclosure.

The following describes variations of the electronic device 1 according to this embodiment. FIG. 8 illustrates a variation of the electronic device 1 according to this embodiment.

In the electronic device 1 illustrated in FIG. 6, an opening of the first accommodation portion 10 and an opening of the second accommodation portion 20 are arranged to face each other. In the variation of the electronic device 1 according to this embodiment, as illustrated in FIG. 8, the opening of the first accommodation portion 10 and the opening of the second accommodation portion 20 are arranged orthogonal to each other. Such a configuration illustrated in FIG. 8 enables the same effect as the electronic device 1 illustrated in FIG. 6. As illustrated in FIG. 8, by providing the holding member 30 for the first accommodation portion 10 and the second accommodation portion 20, the first card 12 and the second card 22 can be stably held.

Additionally, as another variation of the electronic device 1 according to this embodiment, the opening of the first accommodation portion 10 and the opening of the second accommodation portion 20 may be arranged at any angle instead of being orthogonal. Such a configuration enables the same effect as the electronic devices 1 illustrated in FIGS. 6 and 8.

The following describes advantageous effects of the electronic device 1 according to this embodiment.

Figures 9A, 9B:
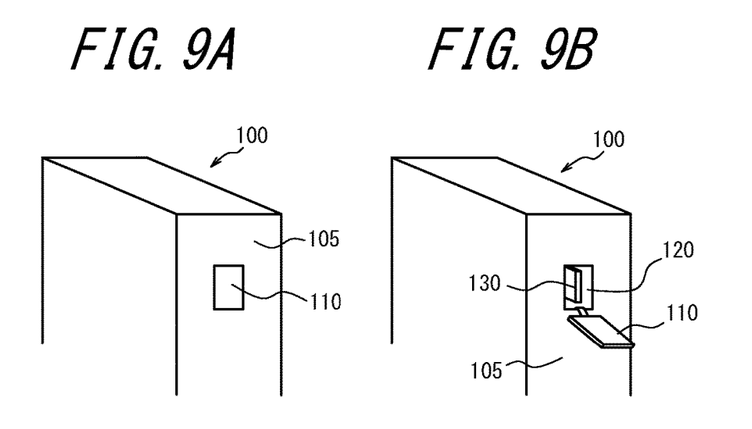
FIGS. 9A and 9B illustrate an advantage of the electronic device according to the embodiment of the present disclosure.

FIGS. 9A and 9B illustrate a waterproof cap type card accommodation portion.

As illustrated in FIG. 9A, an electronic device 100 has a card accommodation portion with a waterproof cap 110 on a side surface of its housing 105. FIG. 9A illustrates a state where the waterproof cap 110 of the electronic device 100 is closed, and FIG. 9B illustrates a state where the waterproof cap 110 of the electronic device 100 illustrated in FIG. 9A is removed. As illustrated in FIG. 9B, in the state where the waterproof cap 110 is removed, a card 130 is accommodated in the card accommodation portion 120.

Such a configuration needs the dedicated waterproof cap 110 to waterproof the inside of the card accommodation portion 120. On the other hand, in the electronic device 1 according to this embodiment, waterproofing provided between the housing 3 and the lid 5 to accommodate the battery 7 eliminates the need for a cap dedicated to the first accommodation portion 10 or the second accommodation portion 20. That is, the electronic device 1 according to this embodiment achieves waterproofing of the first accommodation portion 10 or the second accommodation portion 20 simultaneously by waterproofing the battery 7.

Figure 10A:
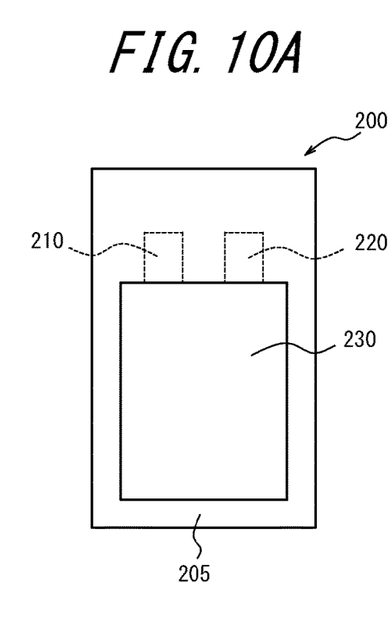
FIGS. 10A and 10B illustrate an advantage of the electronic device according to the embodiment of the present disclosure.
Figure 10B:
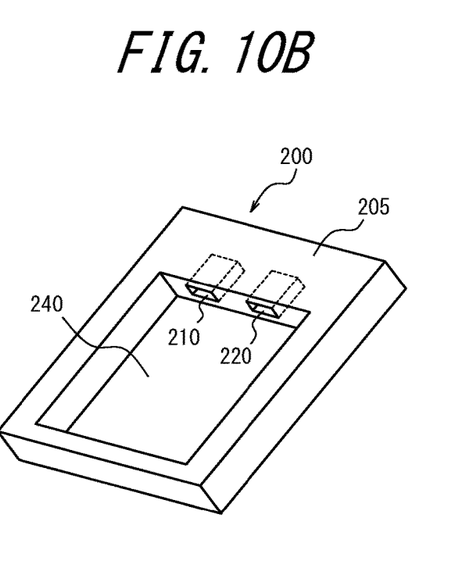

FIGS. 10A and 10B illustrate card accommodation portions provided on a side surface of a battery accommodation portion.

As illustrated in FIG. 10A, in an electronic device 200, a battery 230 is exposed in a housing 205 with a battery lid removed. In the electronic device 200, the user can insert or remove a card by removing the battery 230. FIG. 10B illustrates a state in which the battery 230 is removed from the housing 205 of the electronic device 200. As illustrated in FIG. 10B, the electronic device 200 has card accommodation portions 210 and 220 on a side surface of a battery accommodation portion 240. Each of the card accommodation portions 210 and 220 can accommodate a card.

Such a configuration eliminates the need for dedicated waterproofing measures to the card accommodation portions 210 and 220, by waterproofing the battery 230. The electronic device 200, however, needs spaces different from the battery accommodation portion 240 to provide the card accommodation portions 210 and 220. Consequently, problems due to space restrictions, such as inevitable miniaturization of the battery 230, might occur in a small-sized electronic device 200. On the other hand, in the electronic device 1 according to this embodiment, not only the first accommodation portion 10 and the second accommodation portion 20, but also the ejection paths 40 thereof can be provided in the space 9 for accommodating the battery. Thus, the limited internal space of a small-sized electronic device 1 can be efficiently utilized.

Figure 11:
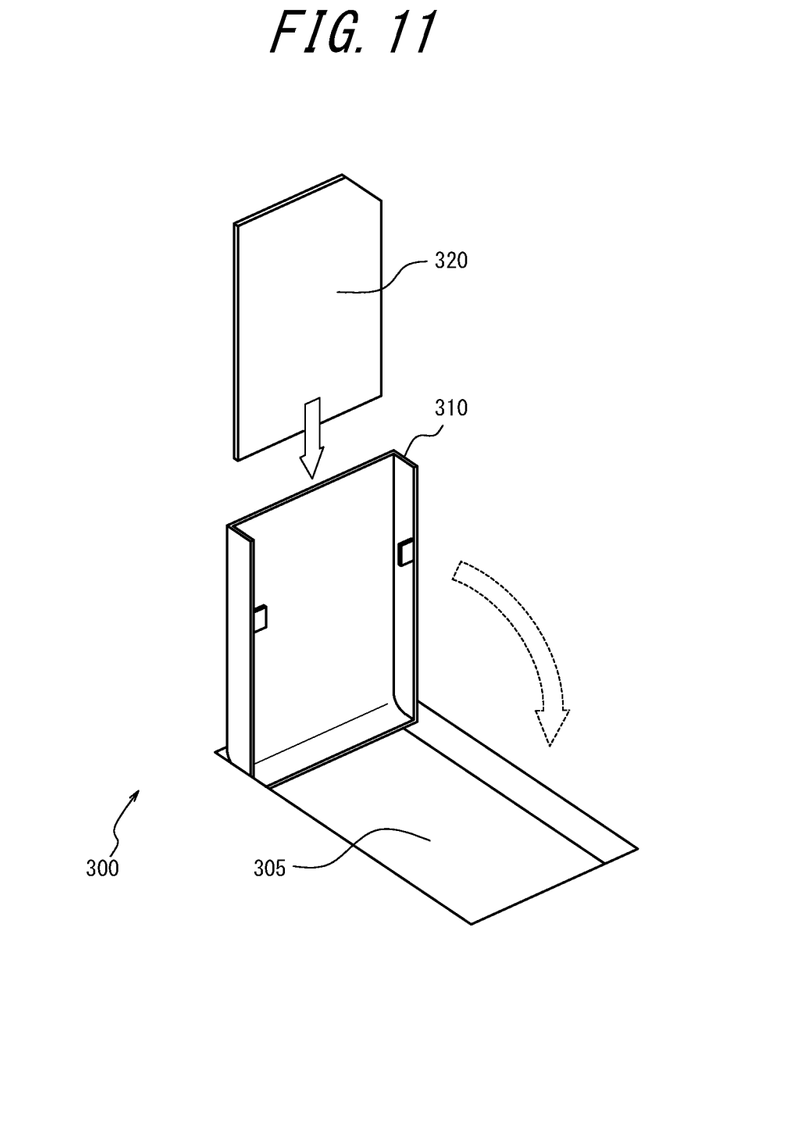
FIG. 11 illustrates an advantage of the electronic device according to the embodiment of the present disclosure.

FIG. 11 illustrates a card accommodation portion having a movable card socket.

As illustrated in FIG. 11, an electronic device 300 has a card socket 310, which can be accommodated in a card accommodation portion 305. FIG. 11 illustrates a state in which one end of the movable card socket 310, which has been accommodated in the card accommodation portion 305, is raised in a vertical direction. In the state illustrated in FIG. 11, the user can slide and insert a card 320 into the card socket 310, and collapse down the card 320 together with the card socket 310, thereby storing the card socket 310 in the card accommodation portion 305. The electronic device 300 can electrically connect the card 320 while the card socket 310 is accommodated in the card accommodation portion 305.

In such a configuration, the card accommodation portion 305 can be provided in a space for accommodating a battery. This eliminates the need for a space different from the battery accommodation space to provide the card accommodation portion 305 and the card socket 310. Further, waterproofing of the battery accommodation space eliminates the need for a dedicated waterproofing measure for the card accommodation portion 305. However, the card socket 310 accommodating the card 320 needs to be fixed tightly to the card accommodation portion 305 in such a configuration. Thus, the card socket 310 is typically required to be made of a hard material, such as metal. Unfortunately, an elaborate member such as a card socket 310 made of a hard material, such as metal, may bend or break relatively easily, if the user adds force more than necessary. Even if the force is unintentional, for example, momentum associated with moving the card socket 310 to remove the card might remain. Such a configuration is relatively fragile, and may cause trouble after being put on the market.

On the other hand, in the electronic device 1 according to this embodiment, the holding member 30 for holding both the first card 12 accommodated in the first accommodation portion 10 and the second card 22 accommodated in the second accommodation portion 20 is made of a material extremely difficult to break, such as an elastic material. Consequently, even after the electronic device 1 has been put on the market, problems associated with the holding member for cards can be significantly reduced.

As described above, according to this embodiment, the convenience of an electronic device that accommodates cards such as IC cards can be enhanced using a relatively simple configuration.

Although this disclosure is based on the accompanying drawings and examples, it is to be noted that various changes and modifications will be apparent to those skilled in the art based on this disclosure. Thus, such changes and modifications are to be understood as included within the scope of this disclosure. For example, functions and the like included in various functional components, means, and steps may be reordered in any logically consistent way. Furthermore, functional components or steps may be combined into one or divided. The above embodiments of this disclosure are not limited to being implemented precisely as described and may be implemented by combining or partially omitting the features thereof.

The invention claimed is:

1. An electronic device, comprising:
a first accommodation portion to accommodate a first card;
a second accommodation portion to accommodate a second card; and
a holding member capable of holding the first card and the second card; wherein
the first accommodation portion and the second accommodation portion are arranged so that an ejection path of the first card and an ejection path of the second card overlap; and
the holding member is located in an area where the ejection path of the first card and the ejection path of the second card overlap.

2. The electronic device according to claim 1, wherein an opening of the first accommodation portion faces an opening of the second accommodation portion.

3. The electronic device according to claim 1, wherein the holding member has a plate-like shape.

4. The electronic device according to claim 1, wherein the holding member holds the first card and the second card, by blocking the ejection path of the first card and the ejection path of the second card.

5. The electronic device according to claim 1, wherein the holding member is displaceable from a state in which it holds the first card and the second card, to a state in which it does not hold the first card and the second card.

6. The electronic device according to claim 5, wherein the holding member is displaceable from the state holding the first card and the second card by releasing at least a part of the holding member.

7. The electronic device according to claim 5, wherein the holding member is displaceable by rotation around one side of the holding member as an axis.

8. The electronic device according to claim 1, wherein the holding member is at least partially elastic.

9. The electronic device according to claim 1, wherein the first accommodation portion and the second accommodation portion are provided at the bottom of a space to accommodate a battery.

10. The electronic device according to claim 9, wherein the battery suppresses displacement of the holding member.

* * * * *